Patented Apr. 14, 1953

2,635,083

UNITED STATES PATENT OFFICE 2,635,083

STABLE THERMOSETTING FORMALDEHYDE-AMIDE COMPOSITION WITH A BUTADIENE SULFONE CURING CATALYST

David E. Cordier, Toledo, Ohio, assignor to Libbey-Owens-Ford Glass Company, Toledo, Ohio, a corporation of Ohio No Drawing. Application September 29, 1950,
Serial No. 187,677

6 Claims. (Cl. 260—17.3)

The invention relates to a thermosetting composition comprising an amine-formaldehyde (or an amide-formaldehyde) reaction product and a novel potentially acid curing catalyst.

When a thermosetting composition is shaped in a mold under pressure at an elevated temperature, it first softens and then hardens at the molding temperature. In contrast, a thermoplastic composition that is hot-molded remains soft until the molded piece is cooled. Thus, an article can be molded from a thermosetting composition by simply placing the composition in a hot mold, closing the mold under pressure, and then after a relatively short time removing the finished article while the mold is still hot. The molding of an article from a thermoplastic composition presents a more complex problem, because an article molded from such a composition must be cooled before the mold is opened, in order to prevent blistering and other deformation which would occur if the mold were opened while the thermoplastic material was still hot.

The length of time for which a molding composition must be left in the mold is one of the factors determining the cost of articles produced from the composition. A composition that must be left in the mold twice as long as another composition requires about twice as much molding equipment for the same volume of production, and hot-molding equipment is expensive.

In the presence of an acid substance, an amine-formaldehyde (or amide-formaldehyde) reaction product of the type hereinafter described is thermosetting; i. e., it is "cured" or transformed by heat from a fusible composition into an infusible resin. (A compound, such as urea, in which the amino groups are attached to a carbonyl group

is ordinarily called an amide; however, the product of the reaction of such a compound with formaldehyde is usually called an amine-formaldehyde composition or aminoplast.) In order to cause such transformation to take place, an acid substance must be present to act as a catalyst. In the molding of an article from an amine-formaldehyde composition, it is necessary to leave the composition in the hot mold for a short time after the mold has been closed in order to complete the transformation to the infusible resin so as to produce an article of optimum quality. The length of time for which it is necessary to leave such a composition in the mold varies with the degree of acidity produced by the acid substance serving as a catalyst: the more acid the composition the shorter the "cure time," i. e., the time required to complete the transformation to an infusible resin in the hot mold. There is, of course, a demand for molding compositions which, in a relatively short time after the mold has been closed, are converted completely into an infusible resin so that the finished article can be removed from the mold.

In spite of the necessity of acidity during the molding of an amine-formaldehyde composition, such a composition cannot be supplied in an acid condition by a manufacturer, because an amine-formaldehyde composition if acid would be unstable in storage. If it were acid, an amine-formaldehyde composition gradually would become infusible at ordinary temperatures, and could not be sold by a manufacturer because it would be infusible and worthless by the time it reached the hands of a molder.

Even slight acidity which causes the composition to become infusible very gradually would make the composition commercially unacceptable, because the plasticity and other molding properties of the composition then would be wholly dependent upon the atmospheric temperature prevailing and the number of hours elapsing between the production of the composition by the manufacturer and the molding of the composition by the user. A user who molds articles from an amine-formaldehyde composition must select a composition of the proper plasticity and test the composition by molding it under various conditions to determine the exact conditions required to give the desired results. In order to maintain the quality of the product, he then must continue to use a composition of exactly the same plasticity and to mold it under exactly the same conditions. If the composition used by the molder is unstable and has molding properties that vary with the length of time elapsed since the composition was produced, it is impossible for the molder to produce successive articles from the composition with satisfactory results.

A "potentially acid" curing catalyst in an amine-formaldehyde composition is an ingredient that causes the transformation of the composition to an infusible resin in a hot mold, but does not materially impair the stability of the composition in storage at ordinary temperatures prior to hot molding. Such a substance is very rare.

A potentially acid substance may be alkaline, neutral or so slightly acid at ordinary temperatures that it does not acidify appreciably an amine-formaldehyde composition when added thereto. It is believed that such a substance breaks up or undergoes molecular rearrangement to form an acid, but does not do so until the molding temperature is reached. In order to act as a curing catalyst, the acid so formed must be strong enough to cause the transformation of the amine-formaldehyde reaction product into an infusible resin.

An amine-formaldehyde molding composition contains an appreciable amount of moisture and frequently is kept in storage for several weeks before being used. Many substances that might be expected to decompose to form acids under the molding conditions suffer the same decomposition within a few hours after being intimately mixed with an amine-formaldehyde composition, and therefore are actually acid and not potentially acid in the composition. Moreover, the behavior of a substance when present as a minor ingredient in a molding composition and subjected to molding pressure at the molding temperature of 270° to 330° F. cannot be predicted from its behavior when subjected by itself to such a temperature under atmospheric pressure. Usually a substance that does not impair the stability of a molding composition fails to cause transformation of the composition to an infusible resin in a hot mold.

The principal object of this invention is to provide a thermosetting amine-formaldehyde composition containing a novel type of potentially acid substance which is capable of imparting to the composition the desirable molding characteristics hereinbefore described.

Another object of the invention is to provide a thermosetting reaction product of formaldehyde with a substance whose molecule has a plurality of $NH_2$ groups each connected to a carbon atom which in turn is connected by a double bond to an atom having an atomic weight from 14 to 16 (i. e., oxygen or nitrogen), containing a potentially acid substance that is very stable during storage of the composition for long periods of time and is capable of producing the degree of acidity required to obtain a highly satisfactory and commercially acceptable "cure time" in the molding of the composition. More specific objects and advantages are apparent from the description, which discloses and illustrates but is not intended to limit the scope of the invention.

The present invention is based upon the discovery that butadiene sulfone and certain of its substitution products are particularly useful as potentially acid curing catalysts. It has been found that when such a butadiene sulfone is used in an amineformaldehyde molding composition the butadiene sulfone curing catalyst imparts extremely fast curing properties to the molding composition without substantially affecting its plasticity or stability during storage over prolonged periods of time.

A dry granular thermosetting composition embodying the invention comprises a resinous reaction product of formaldehyde with a substance whose molecule has a plurality of $NH_2$ groups each connected to a carbon atom which in turn is connected by a double bond to an atom having an atomic weight from 14 to 16 and, as a curing catalyst, a butadiene sulfone wherein any substituents consist of from one to two methyl groups, one of which is attached to a carbon atom other than those connected to sulfur, and any other of which is attached to a non-adjacent carbon atom.

CATALYST

Thus the potentially acid curing catalyst that may be used in compositions embodying the invention include butadiene sulfone (i. e., 2,5-dihydro-thiophene-1,1-dioxide),

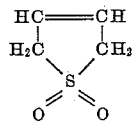

2-methyl butadiene sulfone (i. e., 2,5-di-hydro-3-methyl-thiophene-1,1-dioxide),

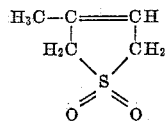

and 2,4 dimethyl butadiene sulfone (i. e. 2,5 dihydro, 2,4-dimethyl-thiophene-1,1-dioxide),

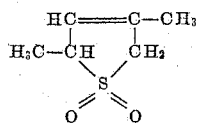

The butadiene sulfones hereinbefore described may be prepared by any known method, such as the reaction of an alkadiene with sulfur dioxide. For example, in one method for the preparation of 2-methyl butadiene sulfone freshly distilled isoprene (60 grams) is placed in a cold bomb with liquid sulfur dioxide (56.5 grams), methanol (44 cc.) and, as a polymerization inhibitor, hydroquinone (2 grams). The reaction mixture is heated slowly to a temperature of about 100° C. and is held at that temperature for approximately four hours, with continual agitation. Since the mixture solidifies as it is poured out of the bomb, sufficient additional methanol is used to rinse the reaction vessel. The resulting solution is treated with a carbon decolorizer (e. g., Darco), filtered, and then concentrated and allowed to crystallize. The solid obtained upon cooling is recrystallized from methanol to produce thick white plates of the product, which may be employed as a potentially acid catalyst in compositions embodying the invention.

THERMOSETTING REACTION PRODUCT

A substance which may be reacted with formaldehyde to form a resinous amine-formaldehyde reaction product for use in the present invention may be (1) a substance whose molecule has a plurality of $NH_2$ groups, each attached to a carbon atom contained in a linear chain, which in turn is connected by a double bond to a nitrogen or oxygen atom, or (2) a substance whose molecule has a plurality of $NH_2$ groups, each attached to a carbon atom contained in a ring, which in turn is connected by a double bond to a nitrogen or oxygen atom.

A substance (1) may be (a) a substance in which each carbon atom that is connected to $NH_2$ groups is connected by a double bond to an oxygen atom, e. g., urea,

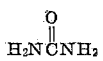

biuret,

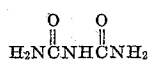

a polyamide such as tartramide,

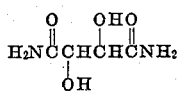

maleamide,

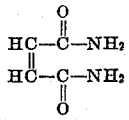

or phenyliminodiacetamide,

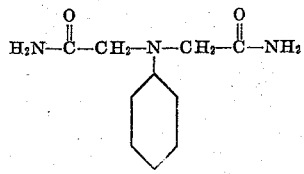

a diureido alkane, e. g., ethylene diurea,

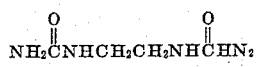

or 1,2-propylene diurea,

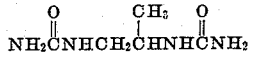

or crotonylidene diurea,

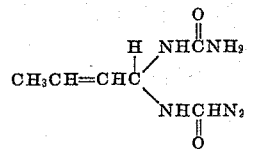

a di-ureidoalkyl ether such as beta, beta'-di-ureidoethyl ether,

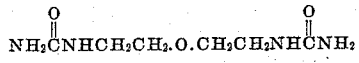

or gamma, gamma'-di-ureidopropyl ether,

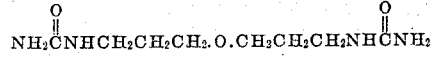

a di-ureidoalkyl polyether such as triethylene glycol diurea,

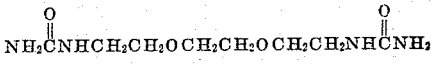

an aliphatic polyamide having urea-end groups; a mono- or polyhydroxy derivative of any of the above-mentioned aliphatic di-ureido compounds in which each hydroxy group is attached to a carbon atom to which no urea group is attached, such as 2-hydroxy trimethylene diurea,

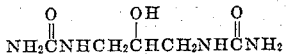

a diurethane such as diethylene glycol dicarbamate,

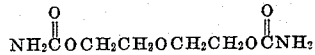

or triethylene glycol dicarbamate,

or a triurea such as diethylene triurea,

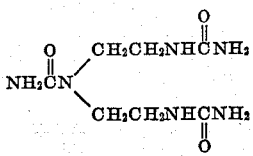

or (b) a substance in which there is not more than one $NH_2$ group connected to each carbon atom which in turn is connected by a double bond to a nitrogen atom, e. g., biguanide,

or dicyandiamidine,

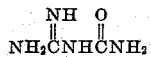

A substance (2) which reacts with formaldehyde to form a resinous reaction product that can be used in the present invention may be (a) a substance whose molecule has a plurality of $NH_2$ groups each attached to a nuclear carbon atom in a triazole ring, such as guanazole,

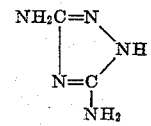

1-phenyl guanazole,

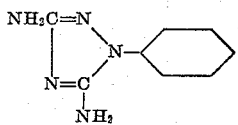

4-aminoguanazole,

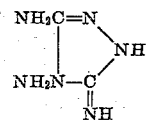

1-carbamyl guanazole,

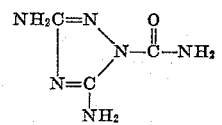

1-guanyl guanazole,

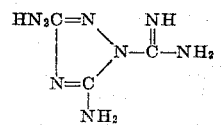

1-acetyl guanazole,

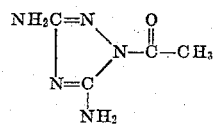

or 1-benzoyl guanazole,

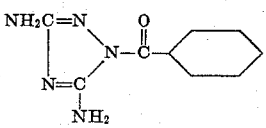

(b) a substance whose molecule contains a plurality of $NH_2$ groups each attached to a nuclear carbon atom in a diazine ring, e. g., a pyrimidine such as 2,4-diamino-6-hydroxy pyrimidine,

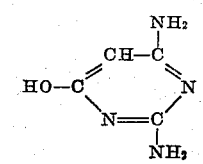

or a quinazoline such as 2,4-diaminoquinazoline,

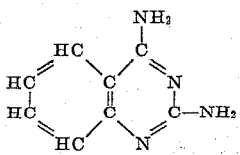

or (c) a substance whose molecule contains a plurality of NH₂ groups each attached to a nuclear carbon atom in a triazine ring, having from one to three triazine rings, and having no functional groups attached to a triazine ring other than the amino groups (such as an amino triazine). The term "functional group" as used herein means any radical in a molecule of such a substance which may enter into undesirable side reactions that interfere with the reaction of formaldehyde with the amino triazine in the production of compositions of the invention (e. g., an OH group attached to a triazine ring may react with formaldehyde during the production of a thermosetting amino triazine-formaldehyde condensation product).

Such a substance may be a triamino triazine, e. g., melamine,

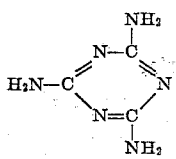

or a diamino triazine (i. e., a monoguanamine) having the general formula

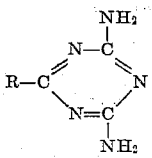

wherein R is a hydrogen atom, a saturated monovalent aliphatic hydrocarbon radical having from 1 to 18 carbon atoms, an aromatic hydrocarbon radical containing 1 benzene nucleus or containing 2 condensed benzene nuclei, a saturated or usaturated cycloaliphatic hydrocarbon radical, or any of the foregoing radicals containing substituents such as aliphatic, cycloaliphatic, aromatic, alkoxy, aryloxy and acyl radicals. Thus, the monoguanamine used may have varying structures and may be of complex structure so long as they do not contain groups which interfere with the condensation reaction of formaldehyde with the guanamine in the practice of the invention. Such monoguanamine include, formoguanamine,

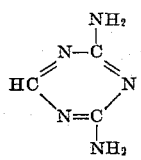

acetoguanamine,

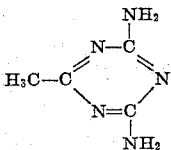

propioguanamine,

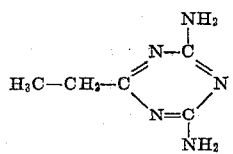

butyroguanamine,

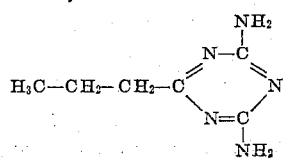

benzoguanamine,

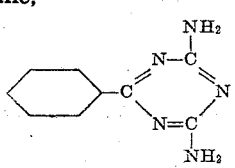

phenylacetoguanamine,

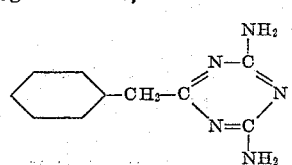

delta-cyano-valeroguanamine,

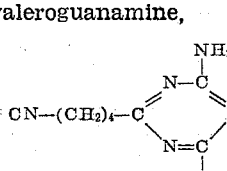

and monoguanamines obtained from the corresponding mononitriles containing as many as 18 carbon atoms, e. g., dodecano-, tetradecano-, hexadecano-, or octadecano-, nitrile. A substance whose molecule contains a plurality of NH₂ groups (as hereinabove described) may also be a diguanamine having the general formula

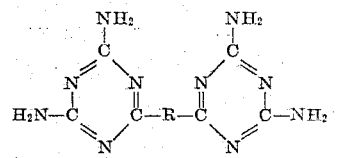

wherein R is a divalent hydrocarbon radical in which the shortest connection between the free valences is through not more than eighteen carbon atoms in series and which contains no substituents or contains substituents such as aliphatic, cycloaliphatic, aromatic, alkoxy, aryloxy and acyl radicals, and compounds having said general formula that are substituted on not more than two exocyclic nitrogen atoms, the substituents consisting of (a) not more than two monovalent aliphatic hydrocarbon radicals on each substituted nitrogen atom, each having not more than four carbon atoms, each having at least one hydrogen atom attached to the same carbon atom as the free valence, and each having not more than one unsaturation, any such unsaturation being an olefinic unsaturation in the beta-gamma position (b) not more than one monovalent radical of the benzene series on each substituted nitrogen atom having not more than eight carbon atoms in which the free valence is connected to the nucleus, and (c) not more than one mono-alkoxy phenyl radical on each substituted nitrogen atom having not more than eight carbon atoms. Thus the diguanamines used may have varying structures and may be of complex structure so long as they do not contain groups which interfere with the condensation reaction of formaldehyde with the diguanamine in the practice of the invention. Such diguanamines include gamma - methyl - gamma - acetyl pimeloguanamine,

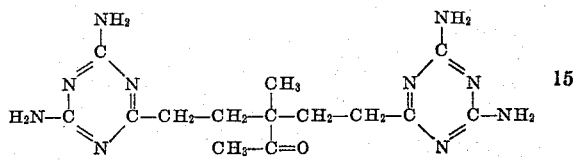

sebacoguanamine,

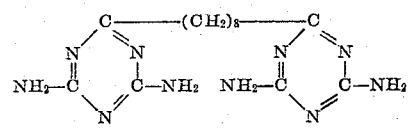

adipoguanamine,

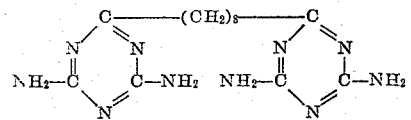

bis-(4,6-diamino-2-triazinyl-ethyl) fluorene,

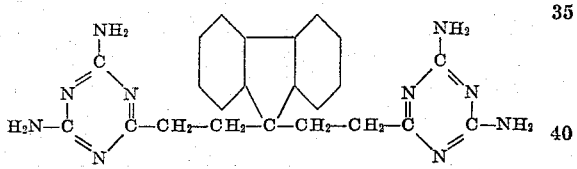

gamma-isopropenyl-gamma-acetyl pimeloguanamine,

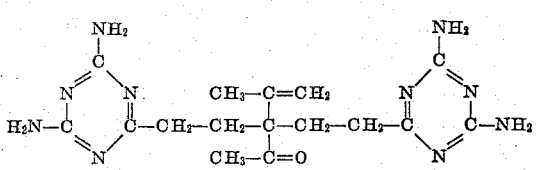

sym.-diphenyladipoguanamine,

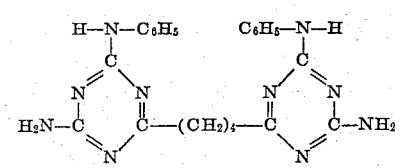

phthaloguanamine,

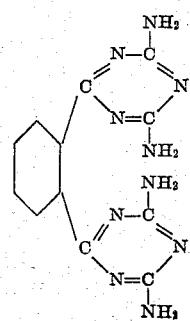

p,p'-bis-2,4-diamino-6-triazinyl diphenyl,

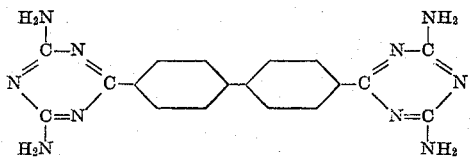

1,2-bis-2,4-diamino-6-triazinyl naphthalene,

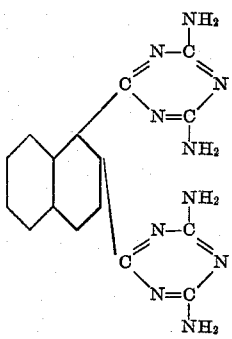

sym. - diphenylsebacoguanamine, sym. - di-p-phenetyladipoguanamine, sym.-di-o-tolyladipoguanamine, terephthaloguanamine and diguanamines obtained from nitriles such as 2,4-dicyanodiphenyl 4,4'-dicyanodiphenyl methane, 4,4'-dicyanodiphenyl ethane, and 4,4'-dicyano-alpha, gamma-diphenyl propane. The polyguanamines which may be used in the practice of the invention include gamma-2,4-diamino-6-triazinyl-gamma-phenylpimeloguanamine.

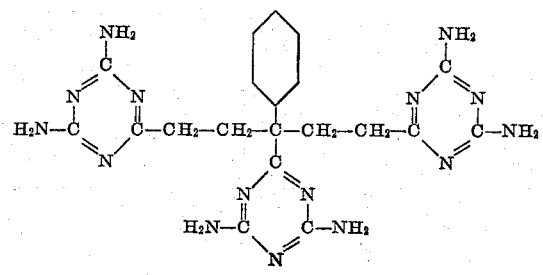

Substances whose molecules contain a plurality of NH₂ groups (as hereinbefore described), for use with formaldehyde to form resinous reaction products which may be employed in the preparation of thermosetting compositions of the invention, may be prepared by any suitable method. Thus a guanamine which contains one or a plurality of 2,4-diamino-6-triazinyl radicals (e. g., a monoguanamine, diguanamine or triguanamine) may be prepared by condensing the corresponding mononitrile, dinitrile or trinitrile with dicyandiamide. The nitrile which reacts with the dicyandiamide must be a specific type of nitrile namely, a nitrile whose molecule contains a cyano radical attached to a saturated carbon atom. In other words, the carbon atom to which the cyano group is attached must not be unsaturated and must not become unsaturated under the reaction conditions. In a nitrile used in a reaction with dicyandiamide as described herein, a nuclear carbon atom in an aromatic ring structure (e. g., an atom in a benzene nucleus) is considered to be saturated.

A mononitrile or polynitrile which may be used in the preparation of a guanamine for use in the present invention may be the nitrile corresponding to a monocarboxylic acid or a polycarboxylic acid, for example, any normal aliphatic carboxylic acid in the series from acetic acid to octadecanoic acid, or in the series from malonic acid to octadecane 1, 18-dicarboxylic acid, any benzene carboxylic acid, or an aromatic carboxylic acid containing two condensed benzene nuclei or two benzene nuclei connected directly or connected by from one to twelve atoms in series, a saturated or unsaturated alicyclic carboxylic acid, the dimer of linoleic acid or an acid obtained by substituting in the molecule of any of the foregoing acids substituents such as aliphatic, cycloaliphatic, aromatic, alkoxy, aryloxy and acyl radicals. Examples of such nitriles include acetonitrile, propionitrile, butyronitrile, valeronitrile, stearonitrile, succinonitrile, glutaronitrile, pimelonitrile, adiponitrile, sebaconitrile, azelaonitrile, octadecanedinitrile, benzonitrile, phthalonitrile, terephthalonitrile, cyanonaphthalene, dicyanonaphthalene, 2,4'-dicyanodiphenyl, 4,4'-dicyanodiphenyl methane, 4,4'-dicyanodiphenyl, 4,4'-dicyanodiphenyl ethane, 4,4'-dicyanoalphagamma-diphenyl propane, 4,4'-dicyanodiphenyl ether, 4-cyanophenyl 4-cyanobenzyl ether, 4,4'-dicyanodibenzyl ether, the ethers formed by the reaction of two molecules of a hydroxy benzonitrile (e. g., 4-hydroxy benzonitrile) with one molecule of the dibromide corresponding to a glycol in the series from methylene glycol to decylene glycol or to diethylene or triethylene glycol, gamma-methyl-gamma-acetylpimelonitrile, gamma-isopropenyl-gamma-acetylpimelonitrile, bis-cyanoethyl fluorene, 4,4'-dicyanobenzophenone, phenylacetonitrile, gamma-cyano-gamma-phenylpimelonitrile and the dinitrile corresponding to the dimer of linoleic acid.

In the preparation of a guanamine by the condensation of a nitrile with dicyandiamide, widely different molal proportions may be used. However, in the preparation of a monoguanamine the preferred proportion ranges from about 1 mol to about 1.5 mols of dicyandiamide for each mol of the nitrile (preferably a mononitrile) and the best results are obtained when the molal proportion is about 1.2 mols of dicyandiamide for each mol of the nitrile. In the preparation of a diguanamine the preferred proportion ranges from about 2.2 to about 2.6 mols of dicyandiamide for each mol of the nitrile (i.e., a dinitrile) and the best results are obtained by using about 2.4 mols of dicyandiamide for each mol of the nitrile. Correspondingly, in the preparation of a triguanamine the preferred proportion of dicyandiamide is slightly greater than 3 mols (i. e., about 3.6 mols) for each mol of the nitrile (i. e., a trinitrile).

The condensation of a nitrile with dicyandiamide is carried out by dissolving a strongly basic catalyst in a suitable primary or secondary alcoholic solvent such as benzyl alcohol or ethylene glycol mono-methyl ether, adding the nitrile and the dicyandiamide in a proportion within the range hereinbefore described, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When precipitation of the guanamine is complete, the precipitate is filtered off and washed with boiling water to remove excess dicyandiamide and the products of side reactions. The guanamine may be purified by converting it to a hydrochloride and neutralizing an aqueous solution of the hydrochloride to liberate the guanamine.

This method of preparation is versatile in that a large variety of nitriles may be used for the reaction with dicyandiamide, to give a wide variety of guanamines.

The nitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the nitrile by dehydration of the amide or directly from the carboxylic acid.

Diguanamines in which one or two of the exocyclic nitrogen atoms are substituted, as, for example, diphenyladipoguanamine, hereinbefore mentioned, may be prepared by various methods. One method consists in reacting 1-phenyl biguanide, 1-o-tolyl biguanide, 1-m-tolylbiguanide, 1-p-tolyl biguanide, 1-(2,5-dimethyl phenyl) biguanide, 1-methyl-1-phenyl biguanide, 1-p-phenetyl biguanide or 1-ethyl-1-phenyl biguanide with sodium carbonate, and adipyl chloride or the dichloride of any other dicarboxylic acid in chlorobenzene. Another method consists in reacting any of the aforementioned aryl or alkyl aryl biguanides, or 1-methyl biguanide, 1-ethyl biguanide, 1-propyl biguanide, 1-butyl biguanide, 1-allyl biguanide, 1-crotyl biguanide, 1,1-dimethyl biguanide, 1,1-diethyl biguanide or 1,1-diallyl biguanide, with the diethyl or dimethyl ester of adipic acid or any other dicarboxylic acid in the presence of an alkoxide catalyst. Still another method consists in reacting an alkyl or aryl dicyandiamide such as phenyl dicyandiamide with adiponitrile or the dinitrile of any other dicarboxylic acid.

A thermosetting resinous reaction product may be obtained by reacting a substance whose molecule has a plurality of $NH_2$ groups each connected to a carbon atom which in turn is connected by a double bond to a nitrogen or oxygen atom, as hereinbefore defined (or a mixture of such substances), either with formaldehyde or with a polymer thereof, such as paraformaldehyde. When used for this reaction, paraformaldehyde is considered to split up so that the substance actually taking part in the reaction is formaldehyde. The substance whose molecule has a plurality of $NH_2$ groups each connected to a carbon atom which in turn is connected by a double bond to a nitrogen or oxygen atom may be reacted with a solution of formaldehyde in water, in an organic solvent such as an alcohol, or in a liquid containing both water and an organic solvent. The reaction may be performed in an autoclave, if desired, to secure a reaction temperature above the boiling point of the solvent. Such a substance may be added to an ordinary commercial aqueous formaldehyde solution having a pH of 4, or to such a solution which has been made less acid, or neutral, or alkaline, preferably at a pH between 6 and 8, by addition of any desired base, such as sodium hydroxide, ammonium hydroxide, borax, or triethanolamine.

In general, the proportion of formaldehyde actually reacting may range from one-half to a maximum of two molecules for each amino group. An excess of either reactant beyond these proportions may be used for the reaction if desired, although an uncombinable excess of one of the reactants usually is not desirable in the final product. Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is urea, the preferred proportions are about 3 mols of formaldehyde for every 2 mols of urea, and when the substance is melamine, the preferred proportions are about 3 mols of formaldehyde for each mol of melamine. Other examples of preferred molar ratios of formaldehyde to substances hereinbefore described are 2:1 for guanazole or 1-carbamyl guanazole, 2:1 for ethylene diurea or propylene diurea, 2.5:1 for diethylene glycol dicarbamate, 4:1 for 2,4-diamino-6-hydroxy pyrimidine, 3:1 for 2,4-diamino quinazoline, 2:1 for formoguanamine, acetoguanamine or benzoguanamine and 5:1 for adipoguanamine or sebacoguanamine.

The reaction proceeds at normal temperature, but heating ordinarily is desirable to shorten the time of reaction, or, in some cases, to dissolve the substance to be reacted with formaldehyde. The reaction may be carried only to its earliest stage, for example, the stage at which the reacting ingredients have just dissolved to form a solution, or to any further stage (short of the infusible stage). By advancing the condensation reaction, it is possible to obtain thermosetting resinous reaction products that are insoluble but still fusible. Such reaction products may be converted by heat into infusible resins.

FILLERS

In the preparation of compositions embodying the invention, any form of cellulose filler may be incorporated in the thermosetting resinous reaction product, for example, alpha cellulose, shredded paper, chopped cloth (e. g., canvas), cotton flock, cotton linters, purified wood fibers in finely ground forms or in felted-fibers forms, lignin-enriched or acid-hydrolyzed lignified wood pulp, walnut shell flour, redwood fiber, cotton cord, sawdust, wooden shavings, ground corn cobs, and regenerated cellulose. However, the preferred cellulose filler for use in the practice of the invention is alpha cellulose, since compositions containing alpha cellulose as a filler have especially desirable chemical and physical properties.

PREPARATION OF MOLDING COMPOSITIONS

In the production of thermosetting molding compositions embodying the invention any suitable method of mixing may be employed. The preferred method of preparing a molding composition of the invention consists in impregnating a cellulose filler with an aqueous solution of the thermosetting condensation product, drying, and then grinding together with the potentially acid curing catalyst to produce a homogeneous powder.

If fibrous cellulose material in the form of paper pulp, wood fiber or the like is to be impregnated with an aqueous solution of a resinous reaction product of formaldehyde with a substance whose molecules contain a plurality of $NH_2$ groups as hereinbefore described, the solution is preferably rendered acid (pH of about 4 to about 6). Heat may be applied to facilitate the drying of the impregnated filler, but, of course, the drying temperature should not be sufficient to render a thermosetting molding composition infusible. The dry product together with the customary modifiers such as hot-plate lubricants, opacifiers, pigments and other coloring matter may be ground in a ball mill to produce a homogeneous powder.

In a molding composition embodying the invention, the proportion of cellulose filler may range from about 20 to about 55 per cent of the composition, the preferred range depending upon the type of filler used and the particular resinous material employed. Usually the preferred proportion of filler is from about 25 to about 35 per cent of the composition. (The terms "parts" and "per cent," as used herein to refer to quantities of material, mean parts and per cent by weight unless otherwise specified.)

Since a potentially acid substance employed in a molding composition embodying the invention is a curing catalyst, the usual catalytic amount may be used (i. e., simply that amount which causes the hardening to take place at the desired speed). It is, of course, well understood in the art that the use of inappreciably small quantities of a potentially acid catalyst is pointless, and also that the use of excessively large quantities of a potentially acid catalyst causes blistering of the product during molding and so increases the rate of cure that satisfactory moldings cannot be produced. In general, the proportion of the potentially acid curing catalyst in a composition of the invention may range from a minimum of about 0.05 per cent of the composition to a maximum ranging from about 2 to about 2.5 per cent of the composition, depending upon the specific curing catalyst and the specific type of molding composition. For example, in a urea-formaldehyde molding composition comprising butadiene sulfone or 2-methyl butadiene sulfone as the potentially acid substance, the preferred proportion of catalyst may range from about 0.1 to about 1.0 per cent of the molding composition, optimum results being obtained when the proportion is about 0.5 per cent of the composition. However, when 2,4-dimethyl butadiene sulfone is used in a urea-formaldehyde molding composition as a potentially acid curing catalyst, the preferred proportion of catalyst may range from about 0.05 to about 1.0 per cent of the molding composition, optimum results being obtained when the proportion of catalyst is about 0.4 per cent of the composition. Since the potentially acid substances hereinbefore disclosed are solids, they can be ground into a molding composition and thoroughly dispersed more quickly and easily than a liquid potentially acid substance.

The fine powder obtained by the hereinbefore described procedure may be used as a molding powder or may be formed, if desired, into coarse granules, or into blanks or preforms of the proper sizes for use in various molds. Molded articles may be produced in the usual manner by compressing the composition in a closed mold under a pressure of about one to four tons per square inch of projected area at a temperature ranging from about 270 to about 330° F.

Butadiene sulfone is particularly effective as a curing catalyst for the thermosetting molding compositions employed. However, the most desirable potentially acid substance that may be used as a curing catalyst in compositions of the invention is 2,4-dimethyl butadiene sulfone, which imparts an even more remarkable improvement in the curing properties of the thermosetting compositions.

MOLDING COMPOSITION TESTS

After a molding composition has been mixed with a particular potentially acid curing catalyst to produce an embodiment of the invention, standard tests may be used to determine the curing properties and the stability of the molding composition. Two standard test methods commonly used are a "duration" test and a water absorption test.

A "duration" test, fundamentally a method for determining the stability of molding compositions such as the compositions of the invention, comprising amine-formaldehyde resinous reaction products, involves a determination of the length of time a molding composition may be held at an elevated temperature without becoming infusible to such an extent that it is no longer capable of being formed completely at molding temperatures in a very short time to produce molded articles having desirable chemical and physical properties. By observation of the "duration" times in a test using a freshly prepared molding composition and in a test using a molding composition which has been stored under certain conditions, it is possible to predict the stability of such a molding composition under such conditions of storage. A "duration" test may be carried out according to the following procedure:

A ⅛ inch shim is placed between the top and bottom plates of a 20 ton hydraulic press which has a test mold that forms a tumbler or large thimble 4 inches high with a 2¼ inch bottom diameter and 3 inch top diameter, weighing about 43.5 grams and holding 300 cc. The mold is heated to a temperature of about 302° F. with 60 pounds per square inch steam line pressure. A sample of a molding composition of the invention (made into a 2³⁄₁₆ inch diameter pill) is placed in the mold cavity and the press is closed immediately. (The shim prevents the press from closing completely.) The "duration" of flow is the maximum number of seconds that the sample may be held in the mold in the foregoing manner and still permit a tumbler to be formed satisfactorily when the shim is removed and the full line pressure of 2,250 pounds per square inch is applied to the mold. For the sake of comparison another sample of the same composition is molded according to a procedure which is the same as that described above except that the molding composition is stored at 125° F. for a prolonged period of time before being tested.

A standard method for checking the rate of cure of a molding composition is a water resistance test of the molded articles. Such a test is based upon the fact that amine-formaldehyde molded articles absorb more water if they are insufficiently cured than if they are completely cured. In the determination of the water resistance, the test pieces used are two inch diameter disks about ⅛ inch thick, obtained by molding the compositions under a pressure of from one to four tons per square inch of projected area in a mold heated with steam at 75 pounds per square inch gauge pressure. The pieces are molded for different periods of time, such as ½, ¾, one, two, and three minutes, in order to determine the completeness of the cure obtained in each case. The pieces are then immersed in boiling water for a given period of time and the increase in weight (i. e., the amount of water absorbed) is recorded.

The "duration" test and the water resistance test, hereinbefore described, may be used to demonstrate the superiority of the compositions prepared in the following examples, which illustrate the practice of the invention.

*Example 1*

(A) A thermosetting composition embodying the invention may be prepared by the following procedure: A solution of 2 mols of urea in formalin (37 per cent commercial aqueous formaldehyde solution) containing 3 mols of formaldehyde is held at a temperature of about 30 degrees C. and at a pH of about 7 for 6 hours. The solution so obtained (120 grams) is used to impregnate alpha cellulose fiber (32 grams) and the impregnated material is thoroughly dried. The dried material is ground in a ball mill with 2,4-dimethyl butadiene sulfone, as a curing catalyst (0.5 per cent of the dried material), zinc stearate, as a lubricant (0.5 per cent of dried material) and any other desired modifiers, to produce a homogeneous powder. The powdery composition so obtained (hereinafter referred to as composition A) is subjected to the tests hereinbefore described to determine the curing properties and storage stability of the composition. Samples of composition (A) may be cured satisfactorily at ordinary molding temperatures in a short time (e. g., ½ to 1 minute) to produce molded articles which have excellent water resistance. For example, a disk molded for 1 minute as hereinbefore described, when immersed in boiling water for 15 minutes, absorbs only 0.120 gram of water.

(B) Another composition of the invention is prepared by a procedure which is the same as the procedure described in (A) except that 2-methyl butadiene sulfone (0.45 per cent of the dried material) is employed as a potentially acid curing catalyst. Samples of the powdered composition (hereinafter referred to as composition B) are tested as hereinbefore described for determination of the curing properties and storage stability of the molding composition.

(C) A third composition embodying the invention is prepared by a procedure which is the same as the procedure described in (A) except that butadiene sulfone (0.4 per cent of the dried material) is used as a potentially acid curing catalyst. Samples of the powdered composition (hereinafter referred to as composition C) are tested as hereinbefore described for determination of the curing properties and storage stability of the molding composition.

(D) For the sake of comparison, a composition is prepared by a procedure which is the same as the procedure described in (a) except that no potentially acid curing catalyst is used. Samples of the powdered composition (hereinafter referred to as composition D) are tested as hereinbefore described and used as controls to show the superiority of the curing properties of the molding compositions of the invention.

The results of a duration test, conducted as hereinbefore described, using samples of compositions prepared as described in (A), (B), (C) and (D), are recorded in Table 1 (below).

TABLE 1

| Composition | Curing Catalyst Employed | Duration Time in Seconds | | |
|---|---|---|---|---|
| | | Original | After 72 hrs. at 125° F. | After 96 hrs. at 125° F. |
| A | 2,4-dimethyl butadiene sulfone. | 21 | 19 | |
| B | 2-methyl butadiene sulfone. | 33 | | 33 |
| C | Butadiene sulfone | 35 | | 31 |
| D | None | 38 | 30½ | |

The remarkable improvement obtained by the use of butadiene sulfone or certain of its derivatives as a curing catalyst may be realized when one compares the performance of these compounds in the practice of the instant invention with the performance of a molding composition without a potentially acid curing catalyst. For example, by comparing the results listed in Table 1 it is evident that the smallness of the decrease in the duration time during storage (therefore, the storage stability) of a composition of the invention (e. g., A, B, or C) is highly superior to that of a composition (D) which is the same except that it contains no potentially acid curing catalyst. Of course, it is always possible to increase the duration time by decreasing the amount of potentially acid substance used, but this necessarily results also in a decrease in the rate of cure, which is not commercially acceptable for economic reasons.

Since the water absorption test is based upon the fact that amine-formaldehyde molded articles absorb more water if they are insufficiently cured than if they are completely cured, this test indicates the improved rate of cure obtained when the curing catalysts of the instant invention are employed. A comparison of the water absorption characteristics of articles molded from a composition embodying the invention and of articles molded from a composition which is the same except that no potentially acid curing catalyst is employed in its preparation, determined by the water resistance test hereinbefore described, is shown in Table 2, in which the water absorption of articles molded from compositions C and D (in grams) after immersion of the disks in boiling water for fifteen minutes.

TABLE 2

| Composition | Curing Catalyst Employed | Molding Time in Minutes | | | | |
|---|---|---|---|---|---|---|
| | | ½ | ¾ | 1 | 2 | 3 |
| C | Butadiene sulfone | 0.320 | 0.245 | 0.220 | 0.130 | 0.115 |
| D | None | 0.430 | 0.365 | 0.335 | 0.220 | 0.185 |

As the results in Table 2 indicate, the water resistance of a composition of the invention on (C) is highly superior to the water resistance of a composition (D) which is the same except that it contains no potentially acid curing catalyst. Thus, the use of butadiene sulfones as curing catalysts in the practice of the invention provides a fast, commercially acceptable cure time for such molding compositions. Moreover, the use of such curing catalysts does not have any deleterious effect upon the storage stability of the compositions.

*Example 2*

A thermosetting composition embodying the invention may be prepared by the following procedure: a solution of 1 mol of melamine in formalin (37 per cent commercial aqueous formaldehyde solution) is held at a temperature of about 80° C. for 10 minutes at a pH of about 7. The resulting reaction product is diluted with water to a solids concentration of approximately 50 per cent, and the mixture (200 grams is used to impregnate alpha cellulose (40 grams). The impregnated material is thoroughly dried and is then ground in a ball mill with butadiene sulfone, as a curing catalyst (0.14 per cent of the dried material) and zinc stearate, as a lubricant (0.8 per cent of the dried material). The powdery composition so obtained has highly satisfactory storage stability and may be cured completely at ordinary molding temperatures in a very short time.

Other compositions embodying the invention may be obtained by a procedure which is the same as that described above except that formaldehyde and guanazole, 1-carbamyl guanazole, ethylene diurea or propylene diurea are employed in a molar ratio of 2:1 as reactants. If desired, a composition embodying the invention may also be obtained by a procedure which is the same as that described in the preceding paragraph except that formaldehyde is reacted with diethylene glycol dicarbamate in a molar ratio of 2.5:1, with 2,4-diamino-6-hydroxy pyrimidine in a molar ratio of 4:1, with 2,4-diamino quinazoline in a molar ratio of 3:1, with formoguanamine, acetoguanamine or benzoguanamine in a molar ratio of 2:1, or with adipoguanamine or sebacoguanamine in a molar ratio of 5:1, to product compositions which are stable during storage and which require only a very short curing time.

Having described the invention, I claim:

1. A dry thermosetting composition comprising a resinous reaction product of formaldehyde with a substance whose molecule has a plurality of $NH_2$ groups each connected to a carbon atom which in turn is connected by a double bond to an atom having an atomic weight from 14 to 16 and whose molecule is free from groups that interfere with the formation of a thermosetting reaction product of formaldehyde with said substance, and as a curing catalyst, a butadiene sulfone wherein any substituents consist of from one to two methyl groups, one of which is attached to a carbon atom other than those connected to sulfur, and any other of which is attached to a nonadjacent carbon atom.

2. A dry thermosetting composition comprising a reaction product of formaldehyde with a substance whose molecule has a plurality of $NH_2$ groups each connected to a carbon atom which in turn is connected by a double bond to an atom having an atomic weight from 14 to 16, and whose molecule is free from groups that intere with the formation of a thermosetting reaction product of formaldehyde with said substance, as a curing catalyst, a butadiene sulfone wherein any substituents consist of from one to two methyl groups, one of which is attached to a carbon atom other than those connected to sulfur, and any other of which is attached to a nonadjacent carbon atom, and a cellulose filler.

3. A dry thermosetting composition comprising a reaction product of formaldehyde with a substance whose moelcule has a plurality of $NH_2$ groups each connected to a carbon atom which in turn is connected by a double bond to an atom having an atomic weight from 14 to 16, and whose molecule is free from groups that interfere with the formation of a thermosetting reaction product of formaldehyde with said substance, as a curing catalyst, a butadiene sulfone wherein any substituents consist of from one to two methyl groups, one of which is attached to a carbon atom other than those connected to sulfur, and any other of which is attached to a non-adjacent carbon atom, and an alpha cellulose filler.

4. A dry thermosetting composition as claimed in claim 1, wherein the curing catalyst is butadiene sulfone.

5. A dry thermosetting composition as claimed in claim 1, wherein the curing catalyst is 2-methyl butadiene sulfone.

6. A dry thermosetting composition as claimed in claim 1, wherein the curing catalyst is 2,4-dimethyl butadiene sulfone.

DAVID E. CORDIER.

References Cited in the file of this patent

UNITED STATES PATENTS

| Number | Name | Date |
| --- | --- | --- |
| 2,410,395 | Smidth | Oct. 29, 1946 |